United States Patent [19]
Kim

[11] Patent Number: 5,920,344
[45] Date of Patent: Jul. 6, 1999

[54] CCD CAMERA DEFECTIVE PIXEL COMPENSATION USING STORED GAIN VALUES

[75] Inventor: Seong-hun Kim, Suwon-city, Rep. of Korea

[73] Assignee: Samsung Electronics Co., Ltd., Kyungki-Do, Rep. of Korea

[21] Appl. No.: 08/623,145

[22] Filed: Mar. 28, 1996

[30] Foreign Application Priority Data

Mar. 28, 1995 [KR] Rep. of Korea .................. 95-7046

[51] Int. Cl.$^6$ ............................................... H04N 9/64
[52] U.S. Cl. ............................................ 348/246; 348/247
[58] Field of Search ............................... 348/241, 246, 348/247

[56] References Cited

U.S. PATENT DOCUMENTS

| | | | |
|---|---|---|---|
| 4,473,845 | 9/1984 | Davy | 348/246 |
| 4,636,863 | 1/1987 | Kaizaki et al. | 348/247 |
| 4,698,685 | 10/1987 | Beaverson | 348/246 |
| 4,701,784 | 10/1987 | Matsuoka et al. | 348/246 |
| 4,903,121 | 2/1990 | Uomori et al. | 358/41 |
| 4,920,428 | 4/1990 | Lin et al. | 348/246 |
| 5,023,713 | 6/1991 | Nishigori | 358/105 |
| 5,047,861 | 9/1991 | Houchins et al. | 348/246 |
| 5,278,638 | 1/1994 | Nakada et al. | 348/247 |
| 5,381,175 | 1/1995 | Sudo et al. | 348/246 |
| 5,392,070 | 2/1995 | Endo et al. | 348/247 |
| 5,440,648 | 8/1995 | Roberts et al. | 382/8 |
| 5,696,554 | 12/1997 | Hwang | 348/246 |

*Primary Examiner*—Wendy Garber
*Assistant Examiner*—Alicia M. Harrington
*Attorney, Agent, or Firm*—Sughrue, Mion, Zinn, Macpeak & Seas, PLLC

[57] ABSTRACT

A defect compensation circuit in a CCD camera for compensating for a defective pixel produced by the CCD camera, which uses digital signal processing, is provided. The apparatus includes a pixel delay for delaying an input pixel signal for one pixel, a subtracter for subtracting a non-delayed pixel signal from the pixel signal delayed by the pixel delay, a comparator for outputting a defect detection signal when the subtracted value generated by subtracter is greater than a value of a predetermined reference level and a compensator for selectively compensating for a defective pixel according to the defect detection signal output from the comparator. Accordingly, a detected defective pixel can be replaced with the value of the level of a previous pixel or can be controlled by selecting a gain constant, so that the camera produces excellent image quality regardless of generation of defective pixels.

6 Claims, 2 Drawing Sheets

CCD CAMERA DEFECTIVE PIXEL COMPENSATION USING STORED GAIN VALUES

BACKGROUND OF THE INVENTION

1. Field of the Invention

The present invention relates to an apparatus for compensating for pixel defects of a charge coupled device (CCD) camera which uses a digital signal processor, and more particularly, to a defect compensation apparatus of a CCD camera which compensates for a defect according to a CCD defect level value detected on a real time basis.

2. Description of the Related Art

In a conventional CCD camera, a defect is compensated for by using a predetermined pixel level in which positions of the pixels have been written in a ROM in advance, or by changing the cut-off frequency of the low-pass filter used to filter the luminance signal.

Here, the method of writing pixel positions in a ROM limits the defined write-capacity of the ROM. Furthermore, the method of using the low-pass filter causes resolution deterioration.

SUMMARY OF THE INVENTION

Accordingly, it is an object of the present invention to provide a CCD camera defect compensation apparatus in which stable image quality can be obtained by compensating for a defective pixel level, without influencing the capacity of a ROM, and further without deteriorating resolution due to a low-pass filter.

To accomplish the above objects, there is provided a defect compensation apparatus of a CCD camera, receiving an input pixel signal, comprising: pixel delay means for delaying the input pixel signal by a predetermined number of pixels and outputting a delayed pixel signal; subtracter means for subtracting the input signal from the delayed pixel signal delayed by said pixel delay means and outputting a subtracted value; comparator means for outputting a defect detection signal when said subtracted value output from said subtracter is greater than a predetermined reference level value; and compensation means for selectively compensating for a defective pixel according to said defect detection signal output from said comparator means.

It is preferable that the delay means includes a first pixel delay for delaying the input pixel signals by one pixel; and a second pixel delay for further delaying the one-pixel delayed signal delayed in the first delay by one pixel and the compensation means includes a selector for selecting one of the one-pixel delayed signal and the two-pixel delayed signal. It is also preferable to further include delay compensators for compensating for delay times of output signals of first and second pixel delays and the comparator, respectively.

To accomplish the above objects, there is also provided compensation means including: storage means for storing gain constants corresponding to normal and defective pixels; selector means for selecting one of said gain constants from said storage means in response to said defect detection signal output from said comparator; and multiplier means for multiplying said delayed pixel signal output from said pixel delay means, by the gain constant selected by said selector means.

It is preferable that the storage means includes registers for storing gain constants of a normal pixel and a defect pixel. It is also preferable to further include delay compensators for compensating for delay times of output signals of the pixel delay means and the comparator, respectively.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE PREFERRED EMBODIMENTS

Figure 1:
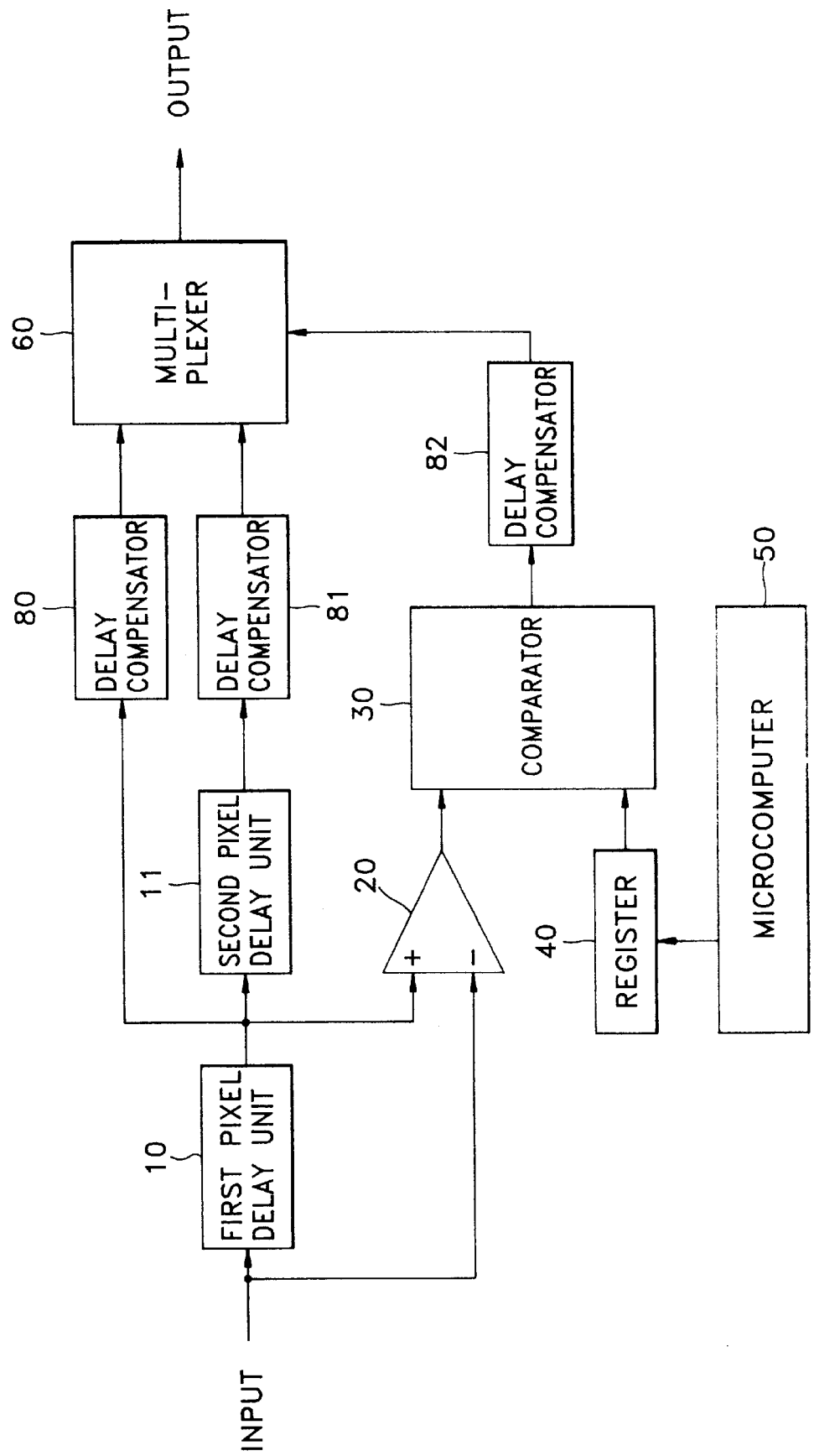
FIG. 1 is a block diagram showing a first embodiment of an apparatus according to the present invention.

Referring to FIG. 1, a defect compensation apparatus of a CCD camera according to a first embodiment of the present invention includes a first pixel delay unit 10 for delaying an input pixel signal by one pixel, a second pixel delay unit 11 for further delaying the input pixel signal by another pixel by delaying the delayed pixel signal output from first pixel delay unit 10 by one pixel. The defect compensation apparatus further includes a subtracter 20 for subtracting the input pixel signal from the pixel signal delayed by one pixel output from first pixel delay unit 10. Also included is a comparator 30 for comparing the output of subtracter 20 with a predetermined level value, and then outputting a defect detection signal when the value of the output signal of subtracter 20 is greater than the predetermined level value. A register 40 is included for storing therein the predetermined level value which is supplied to the comparator 30, and a microcomputer 50 in included for controlling the stored value in the register 40. The apparatus further includes a multiplexer 60 for selecting either the one-pixel delayed signal output from first pixel delay unit 10 or the two-pixel delayed signal output from the second pixel delay unit 11, where the selection is based on the defect detection signal of the comparator 30.

Also, delay compensators 80, and 81 are included for compensating for the delay times of the output signals of first and second pixel delay units 10 and 11, and delay compensator 82 is included to compensator for the delay from comparator 30.

The above-described first embodiment of the present invention operates in the following manner. An output signal from a CCD unit (not shown) is input as a pixel signal and supplied to first pixel delay unit 10 to delay the input signal by one pixel to produce a one-pixel delayed signal. The one-pixel delayed signal is then supplied to subtracter 20 which outputs a difference level obtained by subtracting the input pixel signal, which is not delayed, from the one-pixel delayed signal. The difference level is supplied to comparator 30 which outputs a defect detection signal when the input difference level is greater than a predetermined level value which has been stored in register 40.

Here the predetermined level value stored in register 40 is set under the control of microcomputer 50 and is used as a reference level value for determining a defect pixel. The defect detection signal produced by comparator 30 is output to multiplexer 60 through delay compensator 82 which compensates for the delay time. A selector, such as a switching device, for selecting input signals can be used as the multiplexer 60.

The delay time of the two-pixel delayed signal, delayed by first and second pixel delay units 10 and 11, is compensated for by delay compensator 81, while the delay time of the one-pixel delayed signal, delayed by first pixel delay unit 10, is compensated for by delay compensator 80. The compensated signals, output from compensators 80 and 81 are input to multiplexer 60, which also receives the defect detection signal output from delay compensator 82. Multiplexer 60 selects the one-pixel delayed signal when a normal pixel is detected, and the two-pixel delayed signal when a defective pixel is detected.

Accordingly, when a defective pixel is detected the value of the level of the defective pixel is replaced with a value corresponding to the level of a normal pixel adjacent to the defective pixel. However, few CCDs have two defective pixels which follow one after the other, so that most defective pixels can be compensated for.

Figure 2:
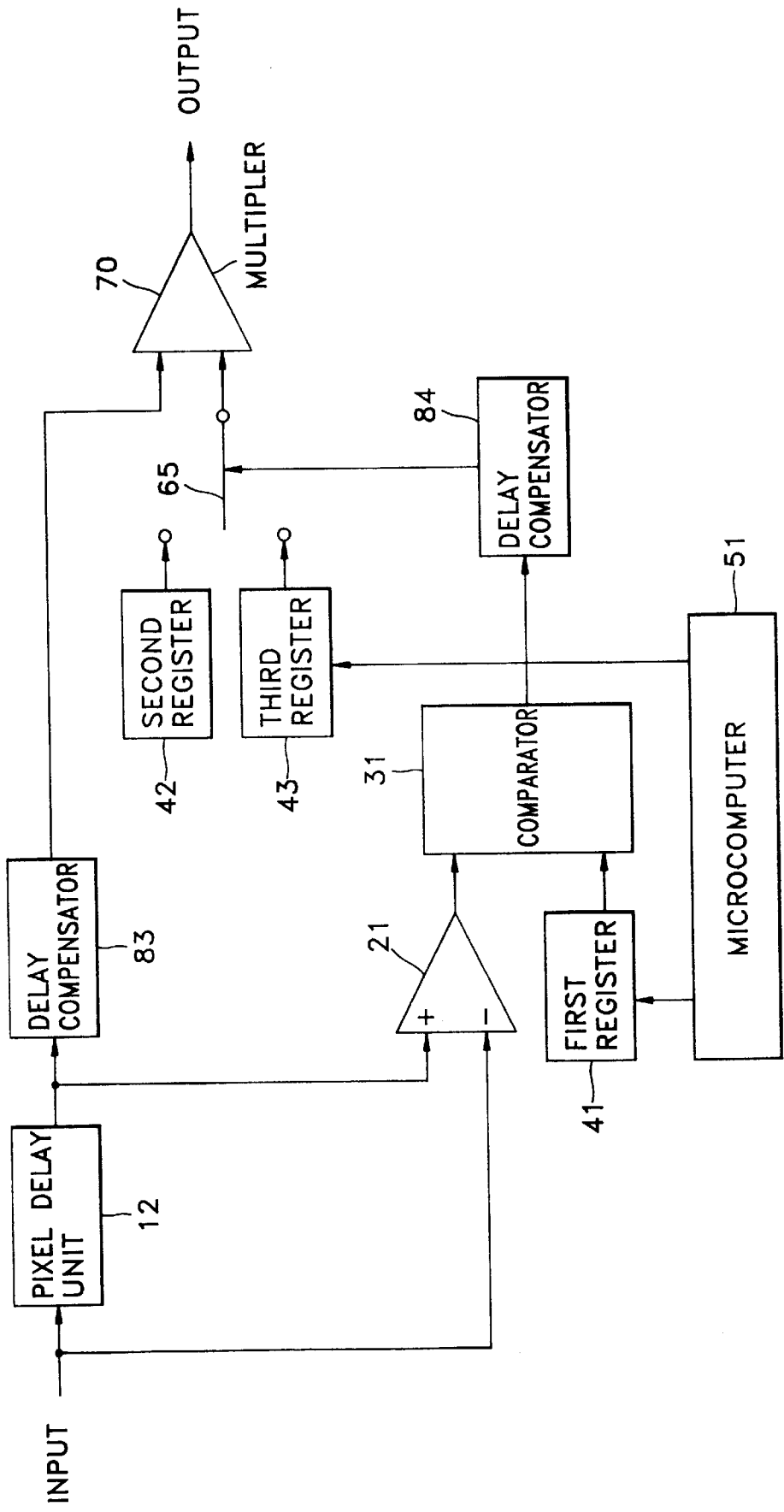
FIG. 2 is a block diagram showing a second embodiment of an apparatus according to the present invention.

Referring to FIG. 2, a defect compensation apparatus of a CCD camera according to a second embodiment of the present invention includes a pixel delay unit 12 for delaying an input signal by one pixel to produce a one-pixel delayed signal, a subtracter 21 for subtracting the input signal from the one-pixel delayed signal output from pixel delay unit 12, and a comparator 31 for outputting a pixel defect detection signal when the output of subtracter 21 is greater than the value of a predetermined level. A microcomputer 51 is included in the defect compensation apparatus for setting the value of the predetermined level supplied to comparator 31, via a first register 41 which stores the value of the predetermined level set by microcomputer 51. The apparatus also includes a second register 42 for storing a predetermined gain constant of a normal pixel, which is set by microcomputer 51, a third register 43 for storing a gain constant of a defective pixel, a switching device 65 for selecting one of the gain constants of pixels stored in second and the third registers 42 and 43, according to the defect detection signal output from comparator 31. A multiplier 70 then multiplies the one-pixel delayed signal, which is output from a delay compensator 83, by the gain constant selected by switching device 65 to produce an output signal.

Here, delay compensators 83 and 84, which compensate for the delay times, are installed on an output line of the pixel delay unit 12 and a pixel defect detection signal output line of comparator 31, respectively.

Operation of the above-described embodiment of the invention shown in FIG. 2 is described as follows. A pixel of an input signal from a CCD portion (not shown) is delayed by pixel delay unit 12 which produces a one-pixel delayed signal which is supplied to subtracter 21. Subtracter 21 outputs a difference signal corresponding to the difference in pixel levels of the input signals. This difference signal is generated by subtracting an adjacent signal, which is not delayed, from the one-pixel delayed signal. The difference signal is output to comparator 31 which outputs a defect detection signal when the difference in levels of an input pixel is greater than a predetermined level.

Here, a value of a predetermined level is stored in a first register 41, the value being set under control of microcomputer 51, and is used as a reference level value for determining if a pixel is defective. The defect detection signal generated by comparator 31 is supplied as a selection control signal to switching device 65 via delay compensator 84 in order to compensate for the delay time. Switching device 65 selects one of the gain constants stored in second and third registers 42 or 43, according to the defect detection signal supplied by comparator 31. Switching device 65 then supplies the selected gain constant to multiplier 70. Here, the gain constants are stored in second and the third registers 42 and 43 under control of microcomputer 51. A gain constant corresponding to a normal pixel is stored in second register 42, and a gain constant corresponding to a defective pixel is stored in third register 43.

Multiplier 70 receives the one-pixel delayed signal from delay compensator 83, and outputs a pixel signal having a gain which is controlled according to the gain constant selected by switching device 65. That is, the one-pixel delayed signal, compensated by delay compensator 83, is supplied to an input terminal of multiplier 70. Multiplier 70 then multiplies that signal by the gain constant stored in either second or third registers 42 and 43, based on the defect detection signal, and outputs the resulting signal. Here, the value of the level of a defective pixel can be compensated for by multiplying the value of the defective pixel by the gain constant which is stored in the third register 43. Accordingly, the defect detection signal causes switch unit 65 to connect the output of third register 43 to an input terminal of multiplier 70 when a defective pixel is detected. Similarly, when no defective pixel is detected, switching unit 65 connects the second register to the input terminal of multiplier 70.

In a defect compensation apparatus of a CCD camera according to the present invention as described above, the value of a detected defective pixel is replaced with a value of the level of a previous pixel or controlled by a selected gain constant of a pixel, so that the camera provides excellent image quality regardless of defect pixel generation.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A defect compensation apparatus of a CCD camera, receiving an input pixel signal comprising:

pixel delay means for delaying the input pixel signal by a predetermined number of pixels and outputting a delayed pixel signal;

subtracter means for subtracting the input signal from the delayed pixel signal delayed by said pixel delay means and outputting a subtracted value;

comparator means for outputting a defect detection signal when said subtracted value output from said subtracter is greater than a predetermined reference level value; and compensation means for selectively compensating for a defective pixel according to said defect detection signal output from said comparator means;

wherein said compensation means comprises;

storage means for storing gain constants corresponding to normal and defective pixels;

selector means for selecting one of said gain constants from said storage means in response to said defect detection signal output from said comparator; and multiplier means for multiplying said delayed pixel signal output from said pixel delay means, by the gain constant selected by said selector means.

2. A defect compensation apparatus of a CCD camera according to claim 1, wherein said storage means comprises registers for storing gain constants of a normal pixel and a defective pixel, and wherein said selector means selects said gain constant for said defective pixel when said defect detection signal indicates a defective pixel and selects said gain constant for said normal pixel otherwise.

3. A defect compensation apparatus of a CCD camera according to claim 2, further comprising first and second delay compensators for compensating for delay times of said output signals of said pixel delay means and said comparator, respectively.

4. A defect compensation apparatus of a CCD camera, receiving an input pixel signal comprising:

- a pixel delay unit receiving the input pixel signal and outputting a delayed pixel signal, corresponding to the input pixel signal delayed by a predetermined number of pixels:
- a subtractor which receives the delayed pixel signal delayed by said pixel delay unit and the input pixel signal, subtracting the two signals and outputting a subtracted signal;
- a comparator which receives the subtracted signal and outputs a defect detection signal in response to said subtracted signal having a value greater than a predetermined reference level value; and
- a compensation unit for selectively compensating for a defective pixel of the input signal in response to said defect detection signal output from said comparator;

wherein said compensation unit comprises:

- a storage unit for storing gain constants corresponding to normal and defective pixels;
- a selector for selecting one of said gain constants from said storage unit in response to said defect detection signal output from said comparator; and
- a multiplier receiving said delayed pixel signal output from said pixel delay unit, and the gain constant selected by said selector and outputting a product of said delayed pixel signal and the selected gain constant.

5. A defect compensation apparatus of a CCD camera according to claim 4, wherein said storage unit comprises registers for storing gain constants of a normal pixel and a defective pixel, and wherein said selector selects said gain constant for said defective pixel when said defect detection signal indicates a defective pixel and otherwise selects said gain constant for said normal pixel.

6. A defect compensation apparatus of a CCD camera according to claim 5, further comprising first and second delay compensators for compensating for delay times of said output signals of said pixel delay unit, and said comparator, respectively.

* * * * *